US008012435B2

(12) United States Patent  
Merritt

(10) Patent No.: US 8,012,435 B2  
(45) Date of Patent: Sep. 6, 2011

(54) NATURAL GAS PRODUCTION UTILIZING A GAS DYNAMIC LASER, WITH COGENERATION OF ELECTRICAL POWER

(76) Inventor: Thomas Merritt, Hollywood, FL (US)

( * ) Notice: Subject to any disclaimer, the term of this patent is extended or adjusted under 35 U.S.C. 154(b) by 1035 days.

(21) Appl. No.: 11/779,080

(22) Filed: Jul. 17, 2007

(65) Prior Publication Data

US 2008/0014129 A1   Jan. 17, 2008

Related U.S. Application Data

(63) Continuation-in-part of application No. 09/475,499, filed on Dec. 30, 1999, now Pat. No. 7,252,806.

(51) Int. Cl.  
*B01J 8/02* (2006.01)  
*B01J 19/08* (2006.01)

(52) U.S. Cl. ........ 422/600; 422/620; 422/623; 422/630; 422/631; 422/198; 422/199

(58) Field of Classification Search .................. 422/600, 422/620, 623, 630, 631, 198, 199  
See application file for complete search history.

(56) References Cited

U.S. PATENT DOCUMENTS

| 3,779,695 | A | 12/1973 | Chamberlain |
| 3,899,749 | A | 8/1975 | Hill et al. |
| 4,100,507 | A | 7/1978 | Born et al. |
| 4,157,270 | A | 6/1979 | Martignoni et al. |
| 7,252,806 | B1 * | 8/2007 | Merritt ........................ 422/168 |
| 2009/0283064 | A1 * | 11/2009 | Merritt ........................ 123/1 A |

FOREIGN PATENT DOCUMENTS

DE   3731046 A1 *  1/1989

OTHER PUBLICATIONS

International Search Report dated Sep. 29, 2008.

* cited by examiner

*Primary Examiner* — Jennifer A Leung  
(74) *Attorney, Agent, or Firm* — Laurence A. Greenberg; Werner H. Stemer; Ralph E. Locher

(57) ABSTRACT

A system and method for producing natural gas is provided. a gas dynamic laser is powered by a gas, such as carbon dioxide, while the same gas is converted by a catalytic converter heated by the beam of the laser. Other gases can be formed simultaneously in other catalytic converters heated by the laser beam. The resulting converted gases can be used to produce a fuel gas. Excess heat and/or by-products of the process can be used to produce electricity.

11 Claims, 9 Drawing Sheets

NATURAL GAS PRODUCTION UTILIZING A GAS DYNAMIC LASER, WITH COGENERATION OF ELECTRICAL POWER

CROSS-REFERENCE TO RELATED APPLICATION

The present application is a continuation in part of the U.S. Non-Provisional patent application Ser. No. 09/475,499 filed Dec. 30, 1999, and entitled FLUE GAS CONVERSION APPARATUS AND METHOD, now U.S. Pat. No. 7,252,806, that application being incorporated herein, by reference, in its entirety.

BACKGROUND OF THE INVENTION

1. Field of the Invention

The present application relates to the production of natural gas, and more particularly, to a system and method for producing natural gas using a gas dynamic laser.

2. Description of the Related Art

Natural gas otherwise known as $CH_4$ presently has several known sources including wells which are primarily drilled for this specific purpose, as well as occurrence as byproducts of oil well drilling, and mining. Other minor sources such as landfills generate this useful gas. Although plentiful supplies exist, a disadvantage exists as well, the most obvious disadvantage being that these supply sources are not always located in the most convenient places, often vast distances from where the fuel will be utilized.

Another disadvantage exists in that the gas is not always in a pure form when extracted, being mixed with sulfur and other impurities, resulting in energy and time to scrub them clean enough to make them suitable for use. Even then in most cases, after having been purified, the gas must be transported to the user over great distances either by liquefying and moving it in large storage vessels, or by moving it across these long distances through pipelines.

Although not associated with its production, a further disadvantage to current systems of gas supply is that, in recent times, it has become the object of disputes occurring across international political boundaries, causing shortages in certain areas and extreme price fluctuations. These factors have a worldwide economic impact.

What is needed is a system and method for efficiently producing a pure form of natural gas.

Additionally, a recently discovered consequence of our industrial age is an increase of the concentration of carbon dioxide ($CO_2$) in our Earth's atmosphere. Such increased $CO_2$ is widely believed to be the cause of global climate changes, resulting in a number of natural catastrophes and meteorological phenomena that caused a great loss of human life. The continued production of $CO_2$ and its resultant increased presence in the Earth's atmosphere could induce further dramatic global climate change, resulting in the further loss of human life and possibly, if unchecked, causing a "runaway greenhouse effect" that could eliminate all human life from the planet.

With the demand for electric power increasing steadily worldwide, thereby increasing the amount of fossil fuels being burned and $CO_2$ emitted, it is readily apparent that some corrective measure must be taken to alleviate this situation. While converting all electric utilities to nuclear power is completely unrealistic, there exists a need in the art for the emergence of fossil fuel burning electric power generation plants that possess the ability to contain all of the resultant emissions in an efficient manner.

U.S. Pat. Nos. 5,027,720, 5,129,331 and 5,265,424, naming one of the present Applicants as inventor/co-inventor, were developed to try to address some of the above-mentioned problems. However, there still exists a need for addressing the final disposition of the enormous quantities of $CO_2$ produced by the burning of fossil fuels. There is further a need for addressing the large quantities of $CO_2$ produced as an end product by fossil fuel burning furnace boilers.

The present invention is particularly suited to overcome those problems that remain in the art in a manner not previously known.

SUMMARY OF THE INVENTION

A system and method for streamlining and simplifying the production of natural gas is provided. A gas dynamic laser is powered by a gas, such as carbon dioxide, while the same gas is converted by a catalytic converter heated by the beam of the laser. Other gases can be formed simultaneously in other catalytic converters heated by the laser beam. The resulting converted gases can be used to produce a fuel gas. Excess heat and/or by-products of the process can be used to produce electricity.

In one particular embodiment of the present invention, natural gas is produced from the $CO_2$ component of flue gas waste emissions created by the burning of fossil fuels, utilizing a gas dynamic laser. Thus, fuel gas produced from this particular embodiment can provide rich sources of energy (i.e., natural gas, electricity), while simultaneously reducing the amount of $CO_2$ emitted into the Earth's atmosphere.

In another particular embodiment of the present invention, natural gas is produced from the combustion of a mixture of air and fuel, the combustion product being utilized in a gas dynamic laser. In this particular embodiment, waste flue gas is not used, so conditioning of the gas products, prior to combustion, is unnecessary.

Other features which are considered as characteristic for the invention are set forth in the appended claims.

Although the invention is illustrated and described herein as embodied in a Natural Gas Production Utilizing a Gas Dynamic Laser with Cogeneration of Electrical Power, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

For a fuller understanding of the nature of the present invention, reference should be had to the following detailed description, taken in connection with the accompanying drawings in which.

Like reference numerals refer to like parts throughout the several views of the drawings.

DETAILED DESCRIPTION OF THE PREFERRED EMBODIMENT

Figure 1:
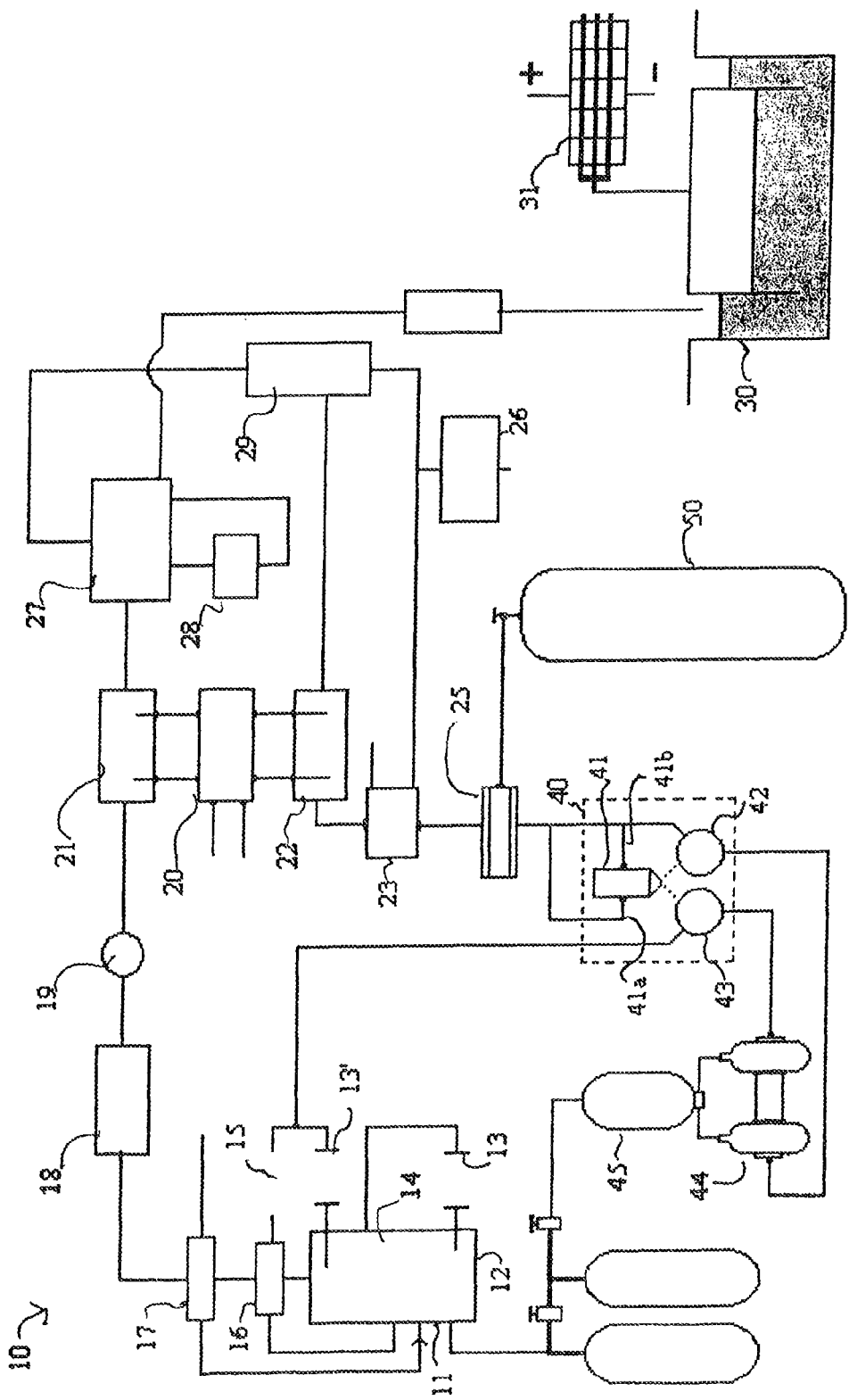
FIG. 1 is a schematic diagram of a flue gas producing system, its interconnected functional components and their positions relative to one particular embodiment of a system using the present invention.

Referring now to FIG. 1, there is shown a schematic diagram of a flue gas producing system, its interconnected functional components and their positions relative to the inventive system. More particularly, a flue gas source 10 is shown in combination with one particular embodiment of the instant invention.

It should be understood that the instant invention will work in combination with any flue gas source. However, for purposes of explanation, the flue gas source 10 of FIG. 1 is depicted as including a furnace 11, wherein fuel is mixed with air and burned. Conventionally, the furnace 11 includes a boiler superheater 12, a steam turbine 13, an intermediate turbine 13', a secondary superheater 14, a condenser 15, an economizer 16, and an air heater 17. Note that, assuming the combustion in the furnace boiler 12 is under stoichiometric conditions, the approximate temperature of the flue gas exiting the furnace 11 is 355° Fahrenheit. The exiting flue gas is a mixture of $N_2$, $CO_2$, $S_2$ and $O_2$.

The resultant flue gas produced by the burning of the fuel/air mixture exits the flue gas source 10 and is processed by one embodiment of the instant invention. More particularly, the flue gas exiting the flue gas source 10 is made to enter a cyclone 18, which removes particulate matter from the flue gas. Note that the cyclone 18 is optional. For example, if the fuel being burned is not coal, then cyclone 18 can be omitted.

Next, at the output of the cyclone 18 (or at the waste outlet of the flue gas source 10, if the cyclone 18 is omitted) an induction fan 19 draws the flue gas, which has a temperature of approximately 355° Fahrenheit, out of the furnace 11 and forces it into a high temperature heat exchanger 21. In the presently preferred embodiment, the high temperature heat exchanger 21 uses water as an exchange medium, in order to lower the temperature of the flue gas to approximately 175° Fahrenheit, while simultaneously producing steam. The steam produced in the high temperature heat exchanger 21 is used to drive a lithium bromide chiller 20, which in turn produces forty degree water. Note that, in one particular embodiment of the instant invention, the chiller 20 consumes 0.006% of the power plant output (PPO).

Upon exiting the high temperature heat exchanger 21, the flue gas proceeds to a fibrous organic waste filter 27, where the approximately 175° Fahrenheit flue gas conditions an organic waste mixture, preparing the mixture for digestion in a biogas production unit 30. Material can be recirculated through the filter 27, if desired, using the pump 28. The biogas production unit 30, otherwise known as a methane digester, produces methane gas, which is extracted and consumed in a fuel cell 31, thereby producing electricity. Note however, other methods of utilizing the fuel can be employed.

In one particular embodiment of the invention, the fuel cell electrical production is equivalent to 1.1% of the PPO and is intended to offset the penalty of operating the flue gas conversion system of the instant invention. Additionally, the biogas production unit 30 converts the spent fibrous organic waste into enormous amounts of topsoil.

Upon leaving the organic waste filter 27 the flue gas is cooled by pond water in heat exchanger 29, in order to remove any water ($H_2O$) contained in the flue gas. This stage consumes 0.28% of PPO and removes 100% of the $H_{2AO}$ plus 10% of the sulfur dioxide ($SO_2$) from the gas. The water removed from the gas, now containing $SO_2$ is directed to a sulfur recovery unit 26 where the sulfur is removed. The water is reused.

When leaving the heat exchanger 29, the temperature of the gas is approximately 150° Fahrenheit. The gas exiting the heat exchanger 29 now enters the low temperature heat exchanger 22, where it is cooled to approximately 60° degrees Fahrenheit. The low temperature heat exchanger 22 uses the forty degree water produced in the chiller 20 as the exchange medium.

Immediately after exiting the low temperature heat exchanger 22, the gas is subjected to an open spray heat exchanger 23 using pond water as the medium of exchange and wherein the remainder of the sulfur dioxide is removed. The sulfur laden water is sent to a sulfur recovery unit 26, where the sulfur is removed and the water returned to the pond. If natural gas is the fuel being burned, as illustrated in FIG. 1, then the remaining gas mixture is already $CO_2'$ and $N_2'$. In such a case, the heat exchanger 23 and sulfur removal component 26 can be omitted. If the fuel being burned in the furnace is coal, then the remaining gas mixture consists of nitrogen ($N_2$), oxygen ($O_2$)' and $CO_2$, with the ratios between $N_2$ and $CO_2$ being approximately 3:1, with $N_2$ predominating.

A gas separator 25 receives the cooled gas mixture from the heat exchanger 23 and removes the nitrogen, which is then stored in a vessel 50 for sale or other uses.

The remaining gas from the gas separator 25, now a significantly pure form of $CO_2$, enters a laser powered gas converter 40, in which it is converted to carbon monoxide.

Figure 2:
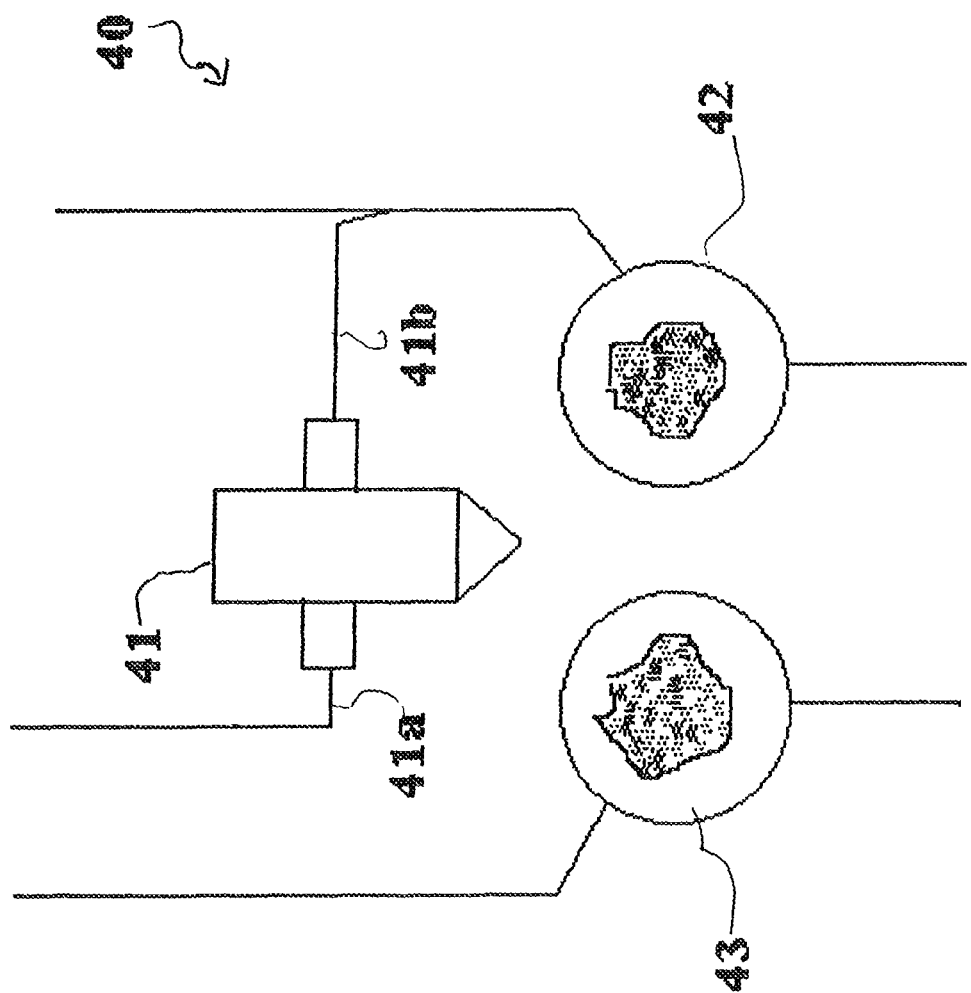
FIG. 2 shows an enlarged view of a portion of the schematic diagram of FIG. 1.

Referring now to FIG. 2, there is shown an enlarged view of the schematic diagram of the gas converter 40 of FIG. 1. More particularly, the laser powered gas converter 40 of the present embodiment includes a flowing gas or "gas dynamic" infrared laser 41 and at least a first catalytic converter 42. Most preferably, the gas converter 40 uses a plurality of catalytic converters, as will be described below.

The flowing gas infrared laser 41 includes a gas inlet 41a and a gas outlet 41b. Carbon dioxide gas flowing through laser 41 exits the gas outlet 41b and is directed through an interconnection or flow path 35 in communication with the inlet of the first catalytic converter 42. By entering the first catalytic converter 42 the expended laser medium joins the main stream of carbon dioxide gas entering the first catalytic converter 42, as well. In this manner a portion of the actual gas used as the reactant in the first catalytic converter 42 is first utilized as a medium for the creation of the laser beam.

With further reference to FIG. 2, a beam splitter 41c splits the laser beam from the laser 41 into multiple separate beams, thus allowing laser 41 to accommodate a plurality of catalytic converters 42, 43. Any variety of chemical compounds can be created by the converter from selected gases introduced into the device depending upon which catalyst is utilized in the catalytic converters 42, 43. Given the amount of carbon dioxide available from the fuel burning process, an enormously powerful laser beam can be created. It is to be noted that a plurality of converters 42, 43 may be utilized, as desired, depending upon the quantity of gas to process.

Note that it is envisioned that other distinct tasks normally associated with a laser are possible by spitting the beam, apart from the present primary function of providing an energy source for catalytic conversion. The laser 41 is most preferably chosen to be of the type known as a "Gas Dynamic Laser", manufactured, for example, by United Technologies Inc. Such lasers are currently marketed for industrial use.

During operation, the first catalytic converter 42 produces carbon monoxide (CO) by passing carbon dioxide over the laser heated catalyst carbon, the chemical equation being:

$$CO_2 + C = 2CO \tag{1}$$

Other suitable catalysts can be substituted. Additionally, hydrogen is produced in a second catalytic converter 43 by passing steam over the catalyst iron (Fe), which is heated by the powerful laser beam created by laser 41 (i.e., with a portion being split-off by the beam splitter 41c), the chemical equation being:

$$4H_2O + 3Fe = Fe_3O_4 + 4H_2 \tag{2}$$

Here again, other suitable catalysts may be substituted.

Referring back to FIG. 1, the gases produced in the catalytic converters 42, 43 are then introduced through a compressor 44 and into a mixer 45, where they are chemically combined, resultantly producing a hydrocarbon fuel product. The mixer 45 can include or be a separate catalytic converter. The product of the reactants is then stored in vessel 55 for the purpose of burning in the furnace boiler.

Since each of the catalytic converters 42, 43 can be constructed with a plurality of inlet connection points, another similar technique to manufacture a hydrocarbon fuel product with the apparatus of FIG. 2 can be employed. This method involves passing both steam and carbon dioxide over a select catalyst of a singular converter element of the gas converter 40, thereby resulting in $CO+H_2$, a well known gaseous fuel. Furthermore, the elements Hydrogen, Carbon, Sulfur, Nitrogen, and Oxygen, all of which are mentioned in the foregoing specification, are all capable of being chemically combined in one way or another.

Thus, the creation of a myriad of other useful products from the combination of these elements is another distinct possibility. As can be seen from the foregoing, by using a constituent of the flue gas as the medium in the flowing gas laser 41, and as a reactant within a catalytic converter irradiated by the laser, the instant embodiment of the invention utilizes carbon dioxide to convert itself into a fuel.

Figure 3:
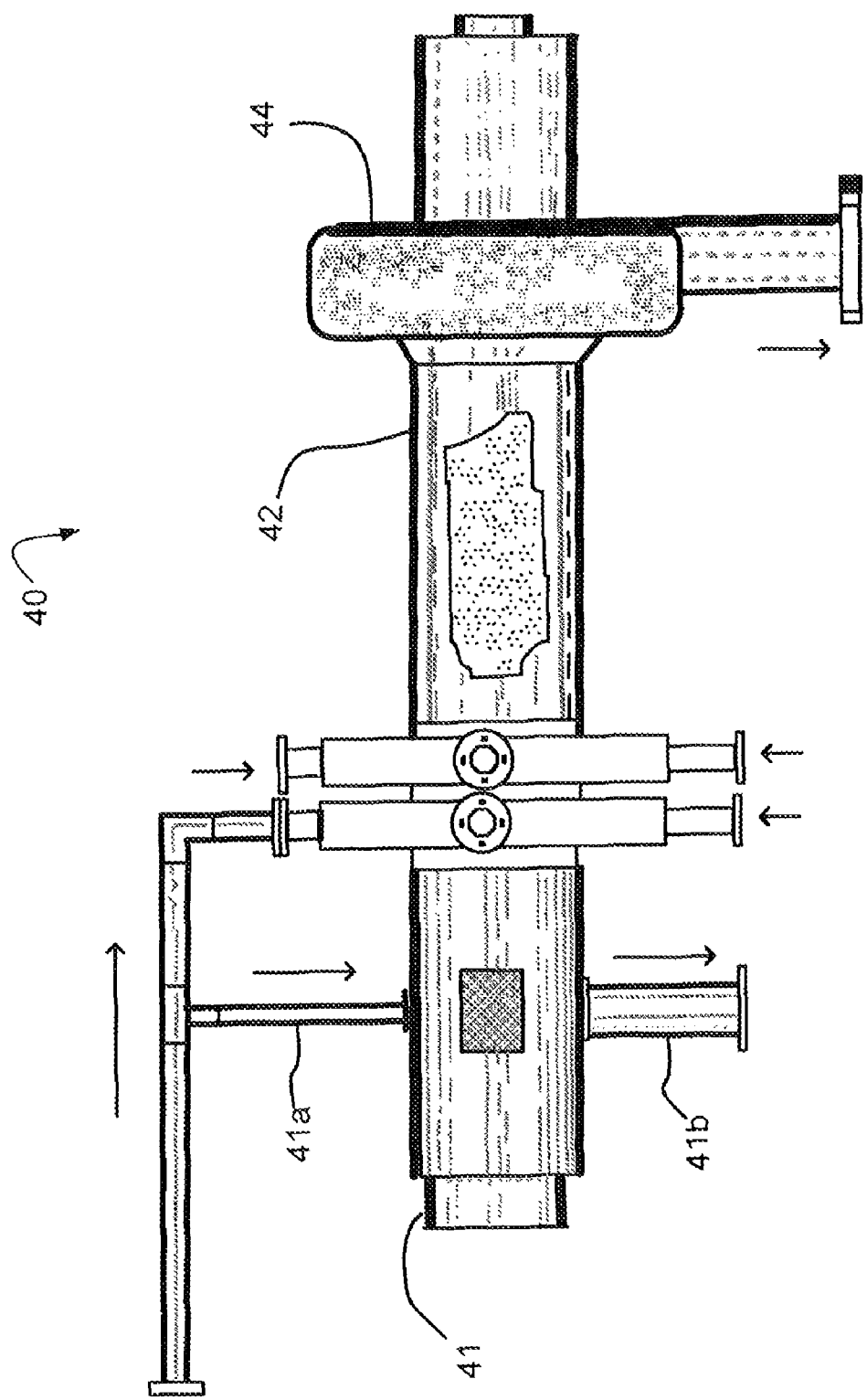
FIG. 3 is a partial cut-away view of a second embodiment of inventive system including a single laser-powered converter element.

FIG. 3 is a partial cut-away view of another embodiment of a gas converter that can be used in connection with the invention of FIG. 1. More particularly, the gas converter 40 of FIGS. 1 and 2 can be replaced by a gas converter that includes a single laser powered catalytic converter element 42, as shown in FIG. 3. Thus, the beam splitter 41c can be omitted, if desired. Additionally, only one compressor 44 would be needed and the mixer 45 could be omitted.

As such, as can be seen, in the embodiments of FIGS. 1-3, a carbon dioxide laser utilizes the conditioned flue gases or waste stream of a conventional power plant to create a powerful laser beam which, when split to form a plurality of beams, a portion thereof is utilized to irradiate a first catalytic converter, converting the $CO_2$ first directed through, and then discharged from, a flowing gas laser into the first catalytic converter. A separate converter, irradiated by another split portion of the beam, is used to reform steam. A chemical combining means or mixer mixes the newly created gases to correct proportional mole fractions whereby a useful fuel product is created. As such, electricity can be produced, while eliminating the flue gas prior to emission into the atmosphere.

As the system disclosed in FIGS. 1-3 can require an enormous apparatus to place the flue gas into a condition where it can actually be utilized in the conversion process, there may be desired a system of conversion that does not require a conditioning process for converting the flue gas.

Figure 4:
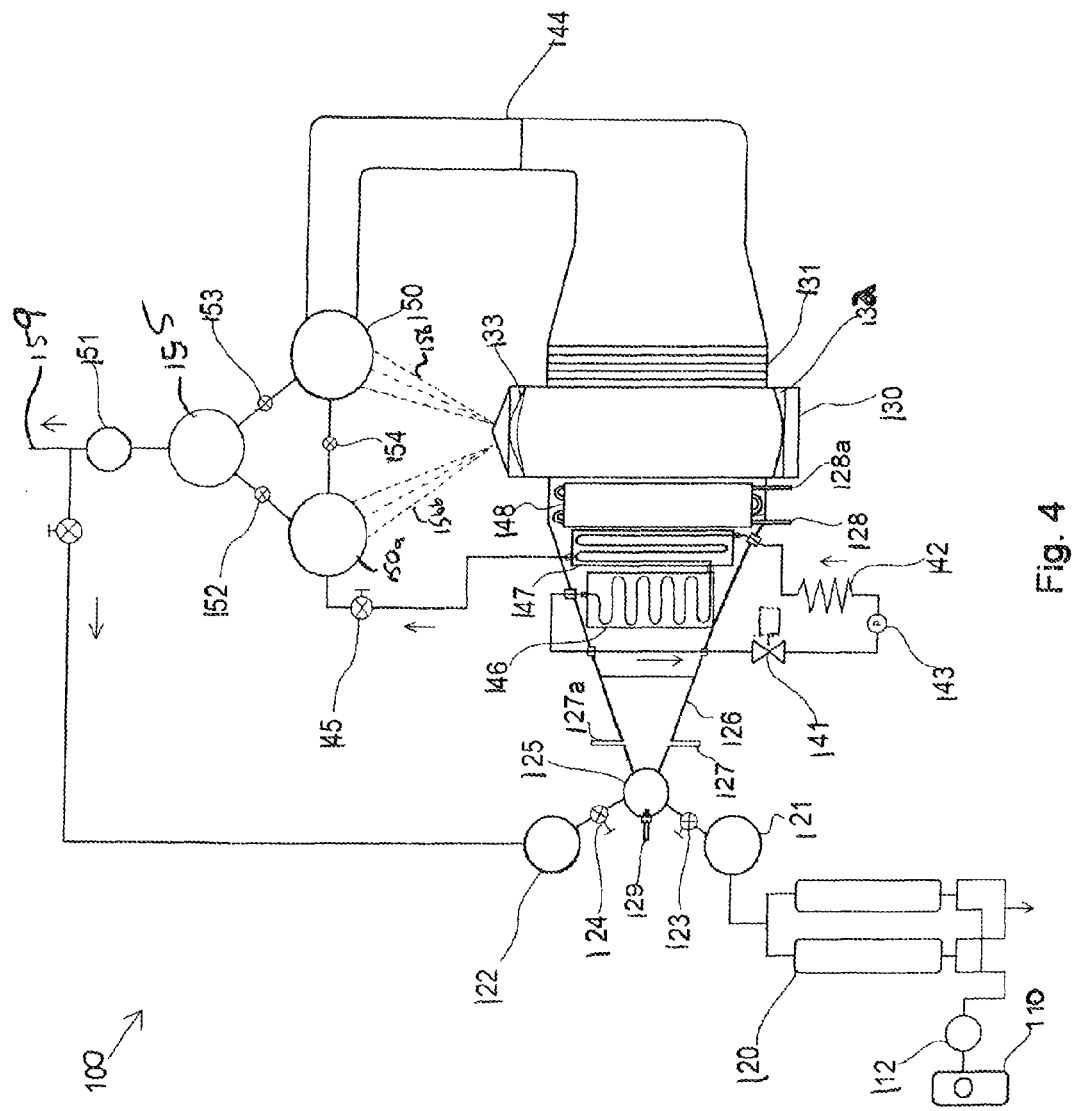
FIG. 4 is a schematic diagram of another particular embodiment of a system using the present invention.

Referring now to FIG. 4 of the instant application, there is shown another preferred embodiment of the present invention. The embodiment of FIG. 4, however, is designed to eliminate the conditioning process, thus focusing on the production of a useful gaseous fuel products, rather than the production of electricity. Rather, the system of FIG. 4 produces useful gaseous fuel products from waste gas, with the production of electricity being the by-product result of the elimination of the waste product.

As will be described hereinbelow, the system of FIG. 4 utilizes carbon dioxide, first formed in a combustor, to actually transform itself into useful fuel products, utilizing only a fraction of the created fuel product to fuel the combustor, while redirecting the excess fuel product back into the gas pipeline infrastructure. Further, in the embodiment of FIG. 4, the conversion of carbon dioxide into useful fuel products is accomplished coincidental to the waste heat generated during its formation, which is, thereafter, utilized to generate substantial amounts of electrical power. Surprisingly, the novel apparatus of FIG. 4, when located in strategic areas where both gas pipeline and electric power grid are relatively near one another, has the ability after start up to turn the gas meter backwards, and over a period of time actually refill natural gas wells, all the while powering the electrical grid with little or no pollutants being discharged into the atmosphere.

Figure 5:
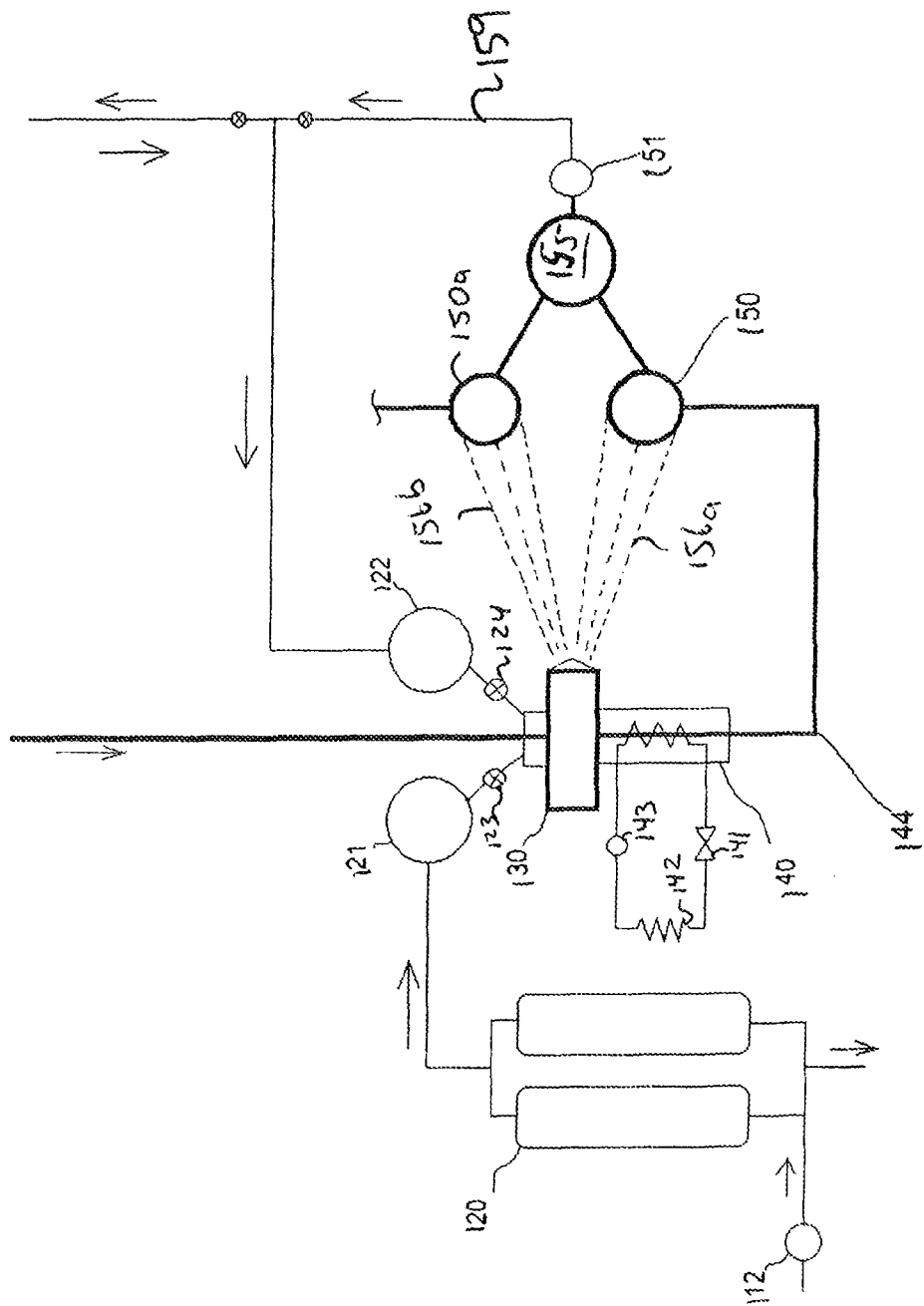
FIG. 5 shows an enlarged, simplified view of another particular embodiment of a system using the present invention.
Figure 6:
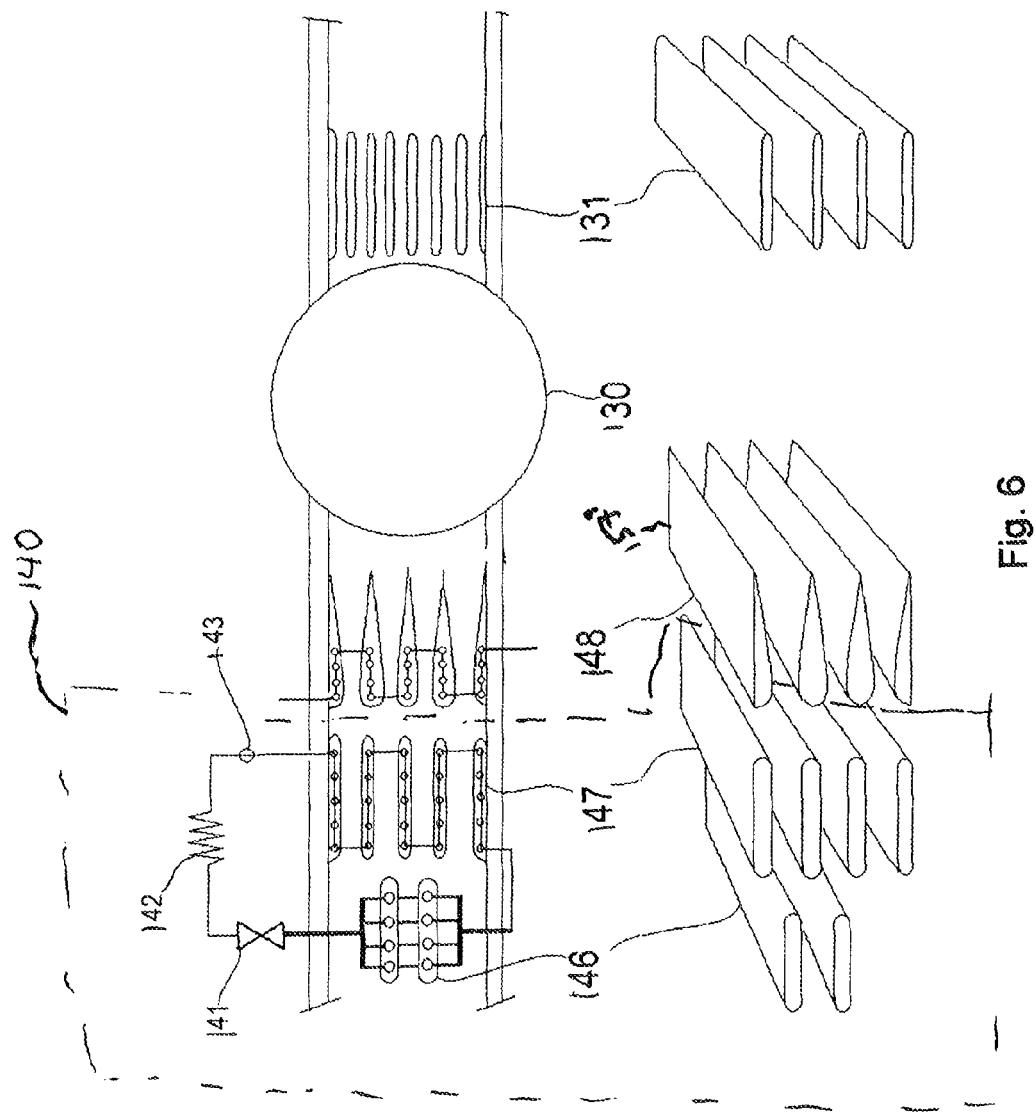
FIG. 6 is an enlarged view of another portion of the schematic diagram of FIG. 4 including one particular embodiment of a novel diffuser component for a gas dynamic laser also serving as a boiler superheater.

Referring, more particularly, to FIGS. 4-6, there is shown a basic schematic flue gas conversion system 100, in accordance with the present particular embodiment of the invention. In the system 100, a compressor 112 forces air (received from an air dryer 110) into a pressure swing adsorber 120, wherein oxygen is separated from the air. This method of air separation, also known as pressure swing adsorption (PSA), is achieved with significantly less energy in comparison to the liquefying of oxygen (i.e., the other known technique of air separation).

Using PSA, a bed of crystal zeolite is utilized to trap the nitrogen portion of the air, yet allow the oxygen to pass through. The nitrogen element of the air is sequentially purged and exhausted through exits 120a and 120b, where it can be stored in tanks and used or sold. The resultant oxygen, having from a 90% to a 95% purity, is then directed into a vessel 121, which is maintained under pressure. Control valves 123 and 124 are used to maintain a stoichiometric air fuel ratio of approximately 3:1 (approximately 90-95% pure oxygen:approximately 5-10% argon) in combustion chamber 125. In the combustion chamber 125, the oxygen is mixed with a fuel component $CH_4$, stored in vessel 122, and ignited, using the ignition element 129.

A nozzle 126 (including fluid inlets 127 and 127a) directs resultant exhaust gases produced in the combustion chamber 125 into and through a resonator 130, a diffuser 131 and into a steam boiler (140 of FIGS. 5 and 6). Resonator 130, also known as a laser cavity, herein illustrated in the most rudimentary form, further comprises a mirror 132 and output coupler and/or beam splitter 133. In one particular preferred embodiment, a laser beam 156 (or 156a and 156b) of the wavelength of 10.6 microns (i.e., the mid infrared range) is produced within the resonator or laser cavity 130. The steam boiler 140 can include the steam super heater 146 and a boiler element 147, as shown in FIGS. 4 and 6. Additionally, as shown in the embodiment of FIGS. 4 and 6, the steam boiler 140 is most preferably located in the nozzle 126, before the laser resonator cavity 130. However, it should be understood that the steam boiler 140 could be located after the resonator cavity 130, as shown in FIG. 5, and still be in keeping with the present invention.

As with the embodiment of FIG. 1, the laser including the resonator 130, which is used in the present embodiment, is a "gas dynamic laser". The chief distinction of a gas dynamic laser from other types of gas lasers is that the gas dynamic laser creates the laser beam from the dynamics of a gas flowing through, thus eliminating the use of a conventional power supply.

Figure 7:
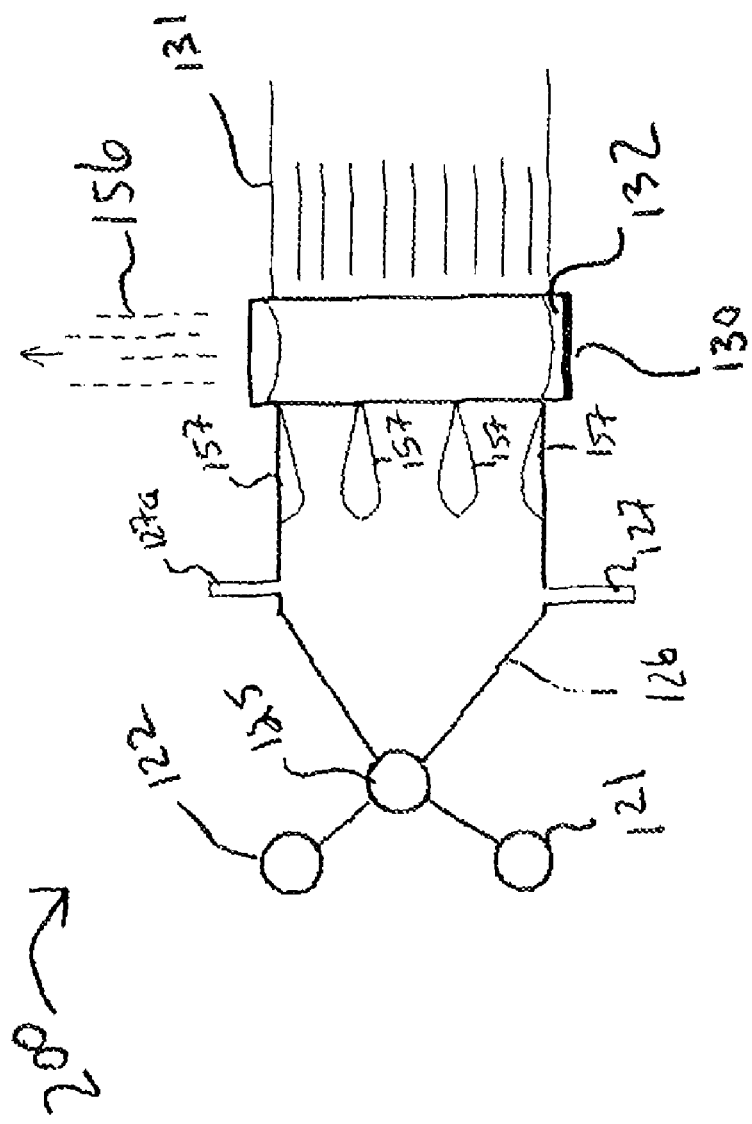
FIG. 7 is a rudimentary line drawing schematic illustration revealing the operational components of a typical gas dynamic laser.

Referring now to FIG. 7, there is shown a rudimentary illustration of a typical gas dynamic laser 200. The gas dynamic laser 200 includes the nozzle 126 (having fluid inlets 127 and 127a), the combustion chamber 125 (which receives components from the vessels 121 and 122, as described above), nozzles 157, the resonator 130 (including the mirror 132) and the diffuser 131. Lasers inherently are rarely over 10% efficient and, in this case, the inefficiency is the result of great amounts of waste heat. However, referring back to FIGS. 4-6, in the present embodiment of the invention, this waste heat will be used to co-generate steam for the production of electricity in the furnace boiler (140 of FIG. 5), the components of which are a steam super heater (146 of FIG. 4), a boiler element (147 of FIG. 4), an economizer or nozzle 126 including a cooling device (148 of FIG. 4) having a fluid inlet and a fluid outlet (128 and 128a, respectively, of FIG. 4), feed pump (143 of FIG. 4), cooling tower (142 of FIG. 4) and steam turbine (141 of FIG. 4).

As stated above, in the present preferred embodiment, the economizer or nozzle 126 of FIG. 4 can, optionally, include a cooling device 148 including the fluid inlet 128 and fluid outlet 128a. Traditionally, as shown in FIG. 7, a gas dynamic laser of the type used herein includes nozzles 157 which, as shown and be foil shaped. In one particular embodiment of the instant invention, as shown more particularly, in FIG. 6, the cooling device 148 includes the nozzles 157', and provides a liquid pathway therethrough. Since air is being separated and hydrogen produced, ammonia ($NH_3$) can also be easily created in the system of the present invention. Such ammonia can be used to cool the nozzle 126, by being circulated through the fluid pathway through the nozzles (157' of FIG. 6) of the cooling device 148, thereby aiding in the cooling of the gas passing through the nozzle 126. For example, ammonia created as a byproduct of the process can be channeled into the cooling device 148 through the fluid inlet 128, and removed through the fluid outlet 128a. If desired, ammonia generated as a by-product in the system can also be used to cool the optics of the laser resonator 130.

As such, referring more particularly to FIGS. 4 and 6, the cooling device 148 is used to "freeze in" the excited population inversion. For example, the nozzle 126 reduces the pressure to, in one preferred embodiment, 50 torr, and increases the velocity to a + Mach number. However, expansion and reduction in the presence of the $CO_2$ in the upper lasing level 001 remain. Other molecules drop to the 001 level. The remaining energy states are depopulated by rapid cooling of the gas using the cooling device 148 in the nozzle 126, thereby achieving inversion.

The diffuser 131 is constructed to function for dual purposes. First, the diffuser 131 will function as the diffuser of the gas dynamic laser, which aids in the formation of spectral lines within the cavity. Typically, in gas dynamic lasers, the diffuser is used to shock down the supersonic flow to subsonic speeds. However, unique to the present invention, the diffuser 131 is additionally constructed to function as the superheater for the steam boiler (140 of FIGS. 5 and 6). Exhaust gases flowing out from the boiler area 140 are moved by induction fan 151 thru duct 144 to catalytic converter 150.

Although represented in FIGS. 4 and 5 as a single element, in practice, each of the catalytic converters 150, 150a will preferably comprise a plurality of catalytic converters, wherein other gases may be catalytically converted (for example, steam for the production of hydrogen ($H_2$)). The method of generating hydrogen by passing steam over hot iron (Fe), also known as reforming steam, was previously performed inefficiently. However, in the present embodiment of the invention, this method becomes extremely efficient, with copious amounts of $H_2$ being created. Control valve 145 of FIG. 4 is provided to permit entry of such steam into the catalytic converter 150a, for the purpose of producing hydrogen ($H_2$). When generating hydrogen, the medium residing in the catalytic converter 150a can be chosen to be the element Fe, preferably in the form of iron sponge. As such, the reaction when heated being $H_2O+Fe \Rightarrow Fe_3O_4+H_2$, in the manner described above, in connection with equation (2).

Generous amounts of steam are available from the boiler 140 in the form of blow off steam. It should be understood that several of these catalytic converters can be utilized to transform many different elements, all being irradiated by the split beam 156a and 156b, split by the beam splitter and/or output coupler 133.

Within the catalytic converter 150, the gas flows through a medium such as carbon, which is irradiated by the beam (156a of FIGS. 4 and 5) created in laser resonator 130 whereby the gas $CO_2$ is converted to CO. The focal length of the laser resonator 130 can be as much as 400 ft. As such, the catalytic converter 150 (and 150a of FIGS. 4 and 5) can be and, preferably, are located at a distance from the laser resonator 130. As such, a protective collar or chamber may be provided between the output of the laser resonator 130 and the catalytic converters 150 and 150a, to enclose the laser beam 156 and prevent a person or object from entering the path of the beam 156 between the output of the laser resonator 130 and the catalytic converters 150 and 150a.

The induction fan 151 further draws the converted CO from the catalytic converter 150 and the $H_2$ from the catalytic converter 150a into a mixer 155, where they are chemically combined, resultantly producing a hydrocarbon fuel product. The mixer 155 can include or be a separate catalytic converter.

The resultant fuel gas product ($CH_4$ in the presently described embodiment) is moved by inductor fan 151, which also serves as a gas compressor, into the conduit or outlet 159 where some percentage of the resultant fuel gas can be split off for use in the combustion chamber 125, while the remainder is siphoned off for outside use. For example, in one particularly preferred embodiment of the present invention, approximately a ¼ portion of the resulting fuel gas is directed to storage vessel 122 for use as fuel in the combustion chamber 125, and the remaining ¾ portion passes out of the conduit 159, as by-product. In one particular preferred embodiment of the invention, the conduit 159 is interconnected into a natural gas mainline existing within the national pipeline structure. An alternate connection will be to a large gas storage facility.

In view of the foregoing, it can be seen that a gas dynamic laser can be used to produce a fuel product, some percentage of which is fed back into the system to fuel the combustor, while the majority can be tapped off for use as fuel. Additionally, as discussed above, the excess waste heat produced by operation of the present invention, can be used to create significant amounts of electricity from the waste steam by-product of the inventive system and method. For example, waste steam produced by the process of generating fuel gas in the system of FIG. 4 can be provided (via a conduit, not shown) to a power plant and used to turn turbines (141 of FIG. 4-6 and 8), in order to generate electricity.

Figure 8:
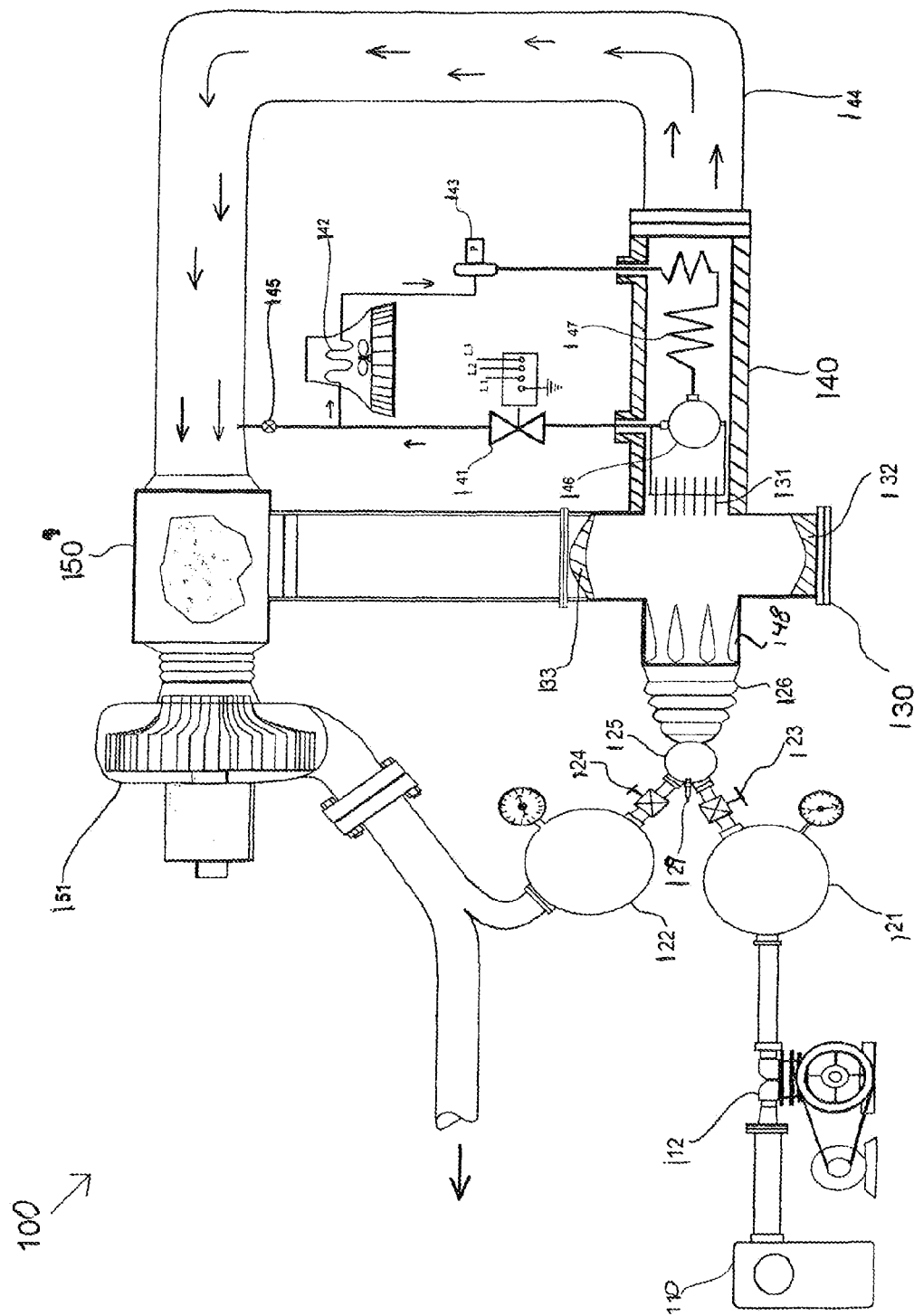
FIG. 8 illustrates a further alternate embodiment of the invention.

Referring now to FIG. 8, there is provided a partial basic diagram of the system 100', showing another possible positioning of the components of the system of the present invention, which positioning would provide the desired results described above. More particularly, in the system 100' the catalytic converter 150' would be used to process both the CO and the $H_2$, instead of the separate catalytic converters 150, 150a, shown in connection with FIG. 4. Additionally, the catalytic converter 150' would serve as the "mixer", thus chemically mixing the resulting catalyzed gases (i.e., CO and $H_2$). As such, as shown in FIG. 8, waste steam is provided into the duct 144 via the control valve 145, at the inlet to the catalytic converter 150'. As can be seen from FIG. 8, the resultant fuel product is diverted partially to the vessel 122, for use in the combustion chamber 125, and partially to an external outlet leading to a pipeline or fuel storage tank (such as 122 of FIG. 4).

Figure 9:
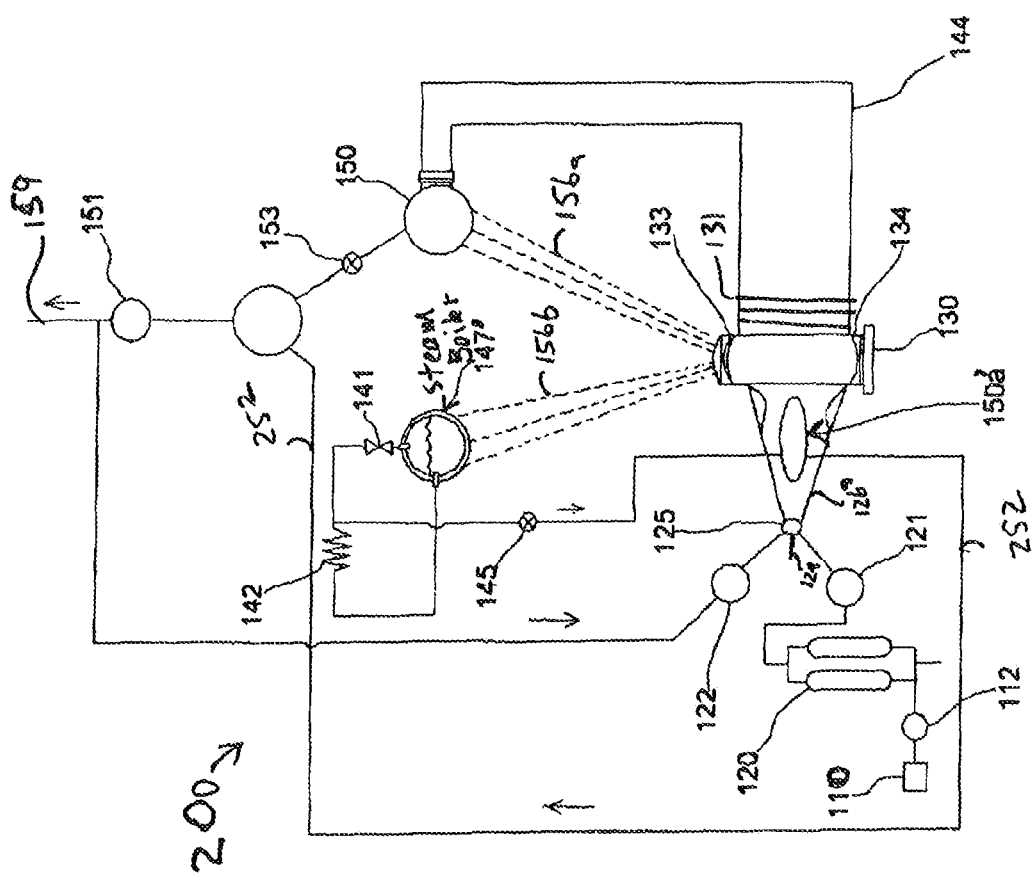
FIG. 9 illustrates still another alternate embodiment of the invention.

Referring now to FIG. 9, there is shown another possible embodiment of the instant invention. The embodiment of FIG. 9 is similar in most respects to the embodiment of the invention described in connection with FIG. 4. However, in the instant embodiment, rather than having a second catalytic converter 150a heated by the laser beam portion 156b as in the embodiment of FIG. 4, a steam boiler 147' is heated by the laser beam portion 156b. Steam output from the steam boiler 147' can be used to drive a steam turbine 141, which, in turn, generates electricity that can be output and used and/or stored.

Additionally, as shown in FIG. 9, in place of the steam boiler 147 in the nozzle 126, the second catalytic converter 150a', including iron as a catalyzing agent, is provided in the nozzle 126'. As such, the excess heat created by the combustion of gases in the combustor portion of the nozzle 26' of the gas dynamic laser is used to heat the iron in the catalytic converter 150'. Steam, made by superheating water in the steam boiler 147a with the laser beam 156b, is provided to the catalytic converter 150a', via the control valve 145. As with the previously described embodiments, the catalytic converter 150 can contain carbon which, when heated by the laser beam 156a in the presence of $CO_2$, outputs CO. Similarly, when steam is provided to the catalytic converter 150a', heated by excess heat produced in the nozzle 126, the steam reacts with the iron catalyst to produce hydrogen ($H_2$). The CO from the catalytic converter 150 and the $H_2$ from the catalytic converter 150a' are provided to the mixer 155, which can be another catalytic converter, as previously described. As can be seen in FIG. 9, an outlet or conduit 252 is provided from the output of the catalytic converter 150a' to an input of the mixer 155, so that hydrogen generated in the catalytic converter 150a' can be provided to the mixer 155.

Note that, although the catalytic converter 150a' is shown as being in the nozzle 126', while the catalytic converter 150 is heated by the laser beam 156a, it can be seen that the present invention is also intended to cover the inverse. For example, the catalytic converter 150 containing the carbon could be provided in the nozzle 126', while the catalytic converter 150a' containing the iron, could be heated by the laser.

The present disclosure is provided to allow practice of the invention, after the expiration of any patent granted hereon, by those skilled in the art without undue experimentation, and includes the best mode presently contemplated and the presently preferred embodiment. Nothing in this disclosure is to be taken to limit the scope of the invention, which is susceptible to numerous alterations, equivalents and substitutions without departing from the scope and spirit of the invention.

I claim:

1. A system for creating a fuel gas, comprising:
    an air separator for separating air into nitrogen and oxygen;
    a combustion chamber for mixing the oxygen with a fuel gas and combusting the mixture to produce at least a first by-product and a second by-product;
    a catalytic converter section for receiving at least a portion of said first by-product and producing a first fuel gas component from said portion;
    a boiler for receiving the second by-product and producing steam;
    said catalytic converter section additionally receiving at least a portion of said steam and producing a second fuel gas component from said portion;
    a laser producing a laser beam for heating said catalytic converter section; and
    a mixer for mixing the first fuel gas component and the second fuel gas component to produce the fuel gas.

2. The system of claim 1, wherein said catalytic converter section includes a single catalytic converter element that receives both the first gas and the second gas.

3. The system of claim 1, wherein said catalytic converter section includes a plurality of catalytic converter elements heated by said laser beam.

4. The system of claim 3, further including a beam splitter for splitting said laser beam into portions, each portion of which corresponding to exactly one of said plurality of catalytic converter elements to heat the plurality of the catalytic converter elements.

5. The system of claim 1, wherein said laser is a gas dynamic laser.

6. The system of claim 5, wherein at least a portion of said first by-product flows through said gas dynamic laser to create the laser beam, prior to passing into said catalytic converter section.

7. The system of claim 5, wherein said first by-product is carbon dioxide.

8. The system of claim 1, wherein at least a portion of said steam is used to produce electricity.

9. The system of claim 1, wherein at least a portion of the fuel gas is fed back into the system for use in said combustion chamber.

10. The system of claim 5, wherein the nozzle of the gas dynamic laser is cooled using ammonia.

11. The system of claim 10, wherein said ammonia is additionally created by the system.

* * * * *